(12) United States Patent
Dikici et al.

(10) Patent No.: US 8,126,232 B2
(45) Date of Patent: Feb. 28, 2012

(54) SYSTEM AND METHOD FOR 3D VESSEL SEGMENTATION WITH MINIMAL CUTS

(75) Inventors: Engin Dikici, Jacksonville, FL (US); Thomas P. O'Donnell, New York, NY (US); Randolph M. Setser, Shaker Heights, OH (US); Richard D. White, Ponte Vedra Beach, FL (US)

(73) Assignee: Siemens Aktiengesellschaft, München (DE)

( * ) Notice: Subject to any disclaimer, the term of this patent is extended or adjusted under 35 U.S.C. 154(b) by 486 days.

(21) Appl. No.: 12/391,501

(22) Filed: Feb. 24, 2009

(65) Prior Publication Data

US 2009/0279758 A1 Nov. 12, 2009

Related U.S. Application Data

(60) Provisional application No. 61/033,958, filed on Mar. 5, 2008, provisional application No. 61/036,607, filed on Mar. 14, 2008.

(51) Int. Cl.
*G06K 9/00* (2006.01)

(52) U.S. Cl. ......... 382/128; 382/173; 382/199; 128/922

(58) Field of Classification Search .................. 382/128, 382/173, 178, 190, 199; 600/416, 481; 128/922
See application file for complete search history.

(56) References Cited

U.S. PATENT DOCUMENTS

2009/0279758 A1* 11/2009 Dikici et al. .................. 382/128
2011/0150274 A1* 6/2011 Patwardhan et al. ......... 382/103

* cited by examiner

*Primary Examiner* — Kevin Pyo
(74) *Attorney, Agent, or Firm* — Donald B. Paschburg; F. Chau & Associates, LLC (57) ABSTRACT

A method for segmenting tubular structures in digital medical images includes extracting a subregion from a 3-dimensional (3D) digital medical image volume containing a vessel of interest, identifying potential vessel centerpoints for each voxel in the subregion by attaching to each voxel a tip of a 3D cone that is oriented in the direction of the voxel's image gradient and having each voxel within the cone vote for those voxels most likely to belong to a vessel centerline, selecting candidates for a second vote image that are both popular according to a first vote image, as well as being consistently voted upon by a radius image, reconfiguring the subregion as a graph where each voxel is represented by a node that is connected to 26 nearest neighbors by n-link edges, and applying a min-cut algorithm to segment the vessel within the subregion.

27 Claims, 7 Drawing Sheets

| Dataset | Average overlap per dataset | | | | | | Average accuracy per dataset | | | | | |
|---|---|---|---|---|---|---|---|---|---|---|---|---|
| | OV | | OF | | OT | | AD | | AI | | AT | |
| | % | SCORE | % | SCORE | % | SCORE | mm | SCORE | mm | SCORE | mm | SCORE |
| 8 | 88.7 | 61.8 | 38.8 | 40.1 | 91.9 | 58.6 | 0.61 | 36.5 | 0.41 | 38.8 | 0.50 | 37.6 |
| 9 | 90.5 | 56.9 | 50.6 | 27.5 | 92.2 | 46.1 | 0.81 | 22.6 | 0.41 | 25.0 | 0.76 | 23.0 |
| 10 | 90.3 | 46.6 | 0.0 | 0.0 | 90.4 | 45.2 | 0.69 | 21.4 | 0.46 | 23.1 | 0.70 | 20.9 |
| 11 | 87.8 | 45.0 | 12.1 | 16.4 | 87.8 | 45.0 | 1.02 | 26.3 | 0.50 | 28.5 | 1.02 | 26.3 |
| 12 | 88.4 | 45.6 | 16.6 | 8.3 | 90.7 | 45.6 | 0.81 | 20.6 | 0.51 | 22.5 | 0.77 | 20.1 |
| 13 | 97.7 | 67.6 | 51.1 | 38.8 | 98.6 | 61.9 | 0.55 | 30.8 | 0.37 | 31.3 | 0.42 | 30.8 |
| 14 | 90.5 | 45.8 | 19.1 | 12.4 | 90.4 | 45.2 | 0.76 | 23.8 | 0.55 | 25.1 | 0.77 | 23.6 |
| 15 | 98.1 | 76.3 | 25.0 | 25.0 | 99.1 | 62.0 | 0.51 | 22.5 | 0.50 | 22.8 | 0.51 | 22.4 |
| 16 | 91.4 | 58.5 | 51.2 | 38.4 | 92.2 | 71.1 | 0.57 | 23.6 | 0.44 | 25.5 | 0.59 | 22.3 |
| 17 | 73.3 | 45.4 | 7.6 | 4.3 | 73.2 | 38.7 | 2.86 | 33.2 | 0.51 | 38.1 | 2.86 | 33.2 |
| 18 | 87.2 | 54.2 | 20.9 | 10.7 | 87.2 | 48.0 | 2.01 | 21.1 | 0.44 | 24.0 | 2.01 | 21.1 |
| 19 | 99.7 | 91.1 | 24.8 | 24.4 | 99.7 | 51.9 | 0.61 | 26.1 | 0.61 | 26.1 | 0.62 | 26.0 |
| 20 | 86.5 | 54.8 | 30.6 | 16.5 | 86.5 | 43.4 | 0.96 | 24.2 | 0.52 | 27.4 | 0.96 | 24.2 |
| 21 | 94.5 | 58.1 | 23.6 | 17.7 | 96.5 | 61.2 | 0.62 | 21.5 | 0.41 | 22.5 | 0.58 | 21.6 |
| 22 | 94.3 | 47.6 | 3.3 | 1.7 | 94.3 | 47.1 | 0.75 | 20.8 | 0.56 | 21.7 | 0.75 | 20.5 |
| 23 | 95.4 | 52.7 | 0.0 | 0.0 | 95.4 | 47.7 | 0.56 | 27.3 | 0.45 | 28.3 | 0.56 | 27.3 |
| Avg. | 90.9 | 56.7 | 23.5 | 17.6 | 91.6 | 51.2 | 0.92 | 25.1 | 0.48 | 26.9 | 0.90 | 25.0 |

| Summary | %/mm | | | score | | |
|---|---|---|---|---|---|---|
| | min | max | avg | min | max | avg |
| AD | 0.29 mm | 7.57 mm | 0.92 mm | 14.8 | 64.3 | 25.1 |
| AI | 0.29 mm | 0.69 mm | 0.48 mm | 15.8 | 65.4 | 26.9 |
| AT | 0.29 mm | 7.57 mm | 0.90 mm | 14.7 | 64.2 | 25.0 |
| OF | 0.0% | 100.0% | 23.5% | 0.0 | 100.0 | 17.6 |
| OT | 66.6% | 100.0% | 91.6% | 33.3 | 100.0 | 51.2 |
| OV | 66.6% | 100.0% | 90.9% | 34.5 | 100.0 | 56.7 |

FIG. 10

SYSTEM AND METHOD FOR 3D VESSEL SEGMENTATION WITH MINIMAL CUTS

CROSS REFERENCE TO RELATED UNITED STATES APPLICATIONS

This application claims priority from U.S. Provisional Application No. 61/033,958 of Dikici, et al., filed Mar. 5, 2008, and from U.S. Provisional Application No. 61/036,607 of Dikici, et al., filed Mar. 14, 2008, the contents of both of which are herein incorporated by reference in their entireties.

TECHNICAL FIELD

This disclosure is directed to the segmentation of vascular structures in volumetric image datasets.

DISCUSSION OF THE RELATED ART

Segmentation of vascular structures in volumetric datasets facilitates several forms of useful analysis. For example, quantification of the dimensions of an aortic aneurysm helps to determine the time point for intervention. In coronary artery disease, the degree of latency of a stenotic lesion influences treatment decisions. And, the planning for the placement of stents and by-pass graphs benefits greatly from the delineation of the vessel boundaries. Finally, a by-product of segmentation is enhanced visualizations, such as fly-throughs, curved reformats, and multiple vessel flattening.

Vessel segmentation is challenging, however. First, branch points, such as bifurcations or trifurcations, add a degree of difficulty to tracking the vessel path. Second, adjacent structures with similar signal intensities may cause a segmentation to "leak" into them. Finally, intensity values within the vessel may vary due to uneven distribution of contrast or partial volume effects and can complicate segmentation.

Fast, accurate vessel segmentation has been a long sought goal in medical image analysis. A rho-theta parameterization can be used for the detection of non-complex objects, such as lines and circles, and many papers have been published which generalize the idea to more complex shapes or even to 3-D. Iterative voting has also been applied for the localization of the salience using radial voting for the detection of the centers of blob shaped objects in stellar data and cell culture systems in 2D and 3D.

While minimal cuts have been extensively used in general image segmentation, it has rarely been applied to the recovery of tubular structures. Since the minimal cuts paradigm seeks to minimize a sum total of the weights of a cut, in single source seed scenarios, blobby structures are favored. Therefore, to segment a non-blob like shape, such as a tube, providing multiple strong t-link connection along the shape skeleton becomes useful. Up to now, it has been challenging to consistently and correctly identify which voxels (the centerpoints) should receive strong t-link weights to the source. As a result, recovery required a user to manually place multiple seeds, which is an impractical solution.

For the computation of vessel centerlines, Dijkstra's shortest path (DSP) algorithm is a natural fit because of the applicability of solution to the task domain. However, there are many caveats that should be addressed in DSP based solutions including but not limited to the following: (1) the scale of the graph should be limited to keep the computational costs low, (2) final centerlines should not hug the borders of the tubular object, (3) surrounding non-targeted objects should not define nodes.

SUMMARY OF THE INVENTION

Exemplary embodiments of the invention as described herein generally include methods and systems for segmenting vessels from volumetric datasets which rely on axial symmetries for the detection of centerpoints of vessels. A centerpoint identification scheme is introduced which exhibits robustness adequate for the application of the minimal cuts paradigm to 3D vessel segmentation and a method for tracking a coronary artery centerline given a single user supplied distal endpoint. Briefly, based on a user supplied seed point, a small cubic subregion of the image volume is extracted. Within this subregion, potential vessel centerpoints are identified by a two stage Hough-like election scheme whereby voxels vote for the most likely points belonging to the vessel centerline. Voxels are restricted to vote in a within a 3D cone-shaped kernel which has its tip located on the voxel, and is oriented in the direction of the voxel's image gradient, such as might be found on a vessel border. These candidates then are winnowed down via a normalized radius image. A point must be both popular according to a first vote image, as well as being consistently voted upon via the radius image to make it to the final vote image. Next, the image volume is reconfigured as a graph upon which the maxflow/minimal cut algorithm will be applied. The t-link weights in the graph are based on the vote image, and the n-link weights on the image intensity and gradient. Applying the min-cut algorithm, the vessel, including any branches, is segmented within the subregion. Intersections of the segmentation with the subregion's boundaries serve as starting points for tracking the vessels' paths. New subregions are centered on these starting points (overlapping with the previous subregion) and the process begins again. An optimal path can be searched from a user supplied endpoint to any point on the aorta surface (an ostium) to recover the vessel of interest.

An algorithm according to an embodiment of the invention can handle branching. Regardless of the number or degree, each branch defines an axial symmetry around its centerline because of its tubular structure. This will be detected. A minimal cut algorithm according to an embodiment of the invention can find a segmentation that does not require an a priori identification of any divisions off the vessel. An algorithm according to an embodiment of the invention can avoid leaking into adjacent strictures of similar intensity due to the normalized radius image. Since centerpoint detection is based on gradients rather than intensities, an algorithm according to an embodiment of the invention is less prone to failure in cases where the vessel intensity fluctuates. The minimal cuts paradigm facilitates simple and intuitive means for editing through the placement of seed points. An algorithm according to an embodiment of the invention does not require multiple scales. A size is specified for a cone-shaped kernel for performance reasons rather than for detection. As long as the cone height is greater than the vessel radius, the centerpoint will be identified.

According to an aspect of the invention, there is provided a method for segmenting tubular structures in digital medical images, including extracting a subregion from a 3-dimensional (3D) digital medical image volume containing a vessel of interest, for each voxel in the subregion, identifying potential vessel centerpoints by attaching to each voxel a tip of a 3D cone that is oriented in the direction of the voxel's image gradient and having each voxel within the cone vote for those voxels most likely to belong to a vessel centerline, selecting candidates for a second vote image that are both popular according to a first vote image, as well as being consistently voted upon by a radius image, reconfiguring the subregion as a graph where each voxel is represented by a node that is connected to 26 nearest neighbors by n-link edges, and applying a min-cut algorithm to segment the vessel within the subregion.

According to a further aspect of the invention, the segmented vessel includes branches.

According to a further aspect of the invention, the method includes detecting intersections of the segmented vessel with the subregion's boundaries, where intersection voxels serve as starting voxels for extracting a new subregion overlapping with the current subregion, where the new subregion serves to track the vessel's centerline.

According to a further aspect of the invention, the subregion is a cubic subregion of size $$x_i = \left[\frac{-d}{2}, \frac{d}{2}\right]$$

for each axis i centered on a user supplied starting voxel where d is predetermined based on a vessel category.

According to a further aspect of the invention, a voxel $\vec{v}$ within the 3D cone is defined with respect to the cone tip voxel $\vec{x}$ as $$\vec{v} = \vec{\Theta}\left(\frac{\nabla I(\vec{x})}{\|\nabla I(\vec{x})\|}\right)[r\cos(\theta)\sin(\alpha), r\sin(\theta)\sin(\alpha), r\cos(\theta)]^T,$$

where $\frac{\nabla I(\vec{x})}{\|\nabla I(\vec{x})\|}$ is the image gradient, $$\vec{\Theta}\left(\frac{\nabla I(\vec{x})}{\|\nabla I(\vec{x})\|}\right)$$

is a rotation matrix aligning the central axis of the cone with the image gradient direction, $\alpha:[-\alpha_{max}, \alpha_{max}]$, is an angle $\vec{v}$ forms with the image gradient vector, $$r:\left[0, \frac{h}{\cos(\alpha_{max})}\right],$$

is a length of a vector represented by $\vec{v}$, and $\theta: [0, 2\pi]$ is a sweep out parameter.

According to a further aspect of the invention, voting comprises incrementing a first vote image as $V(\vec{x}+\vec{v}) = V(\vec{x}+\vec{v}) + K(\vec{v})\log(|\nabla I(\vec{x})|)$ for each voxel $\vec{v}$ in the cone, where $$\left(-\frac{d}{2}, -\frac{d}{2}, -\frac{d}{2}\right) \leq (\vec{x}+\vec{v}) \leq \left(\frac{d}{2}, \frac{d}{2}, \frac{d}{2}\right),$$

incrementing a radius image as $R(\vec{x}+\vec{v}) = R(\vec{x}+\vec{v}) + K(\vec{v})|\vec{v}-\vec{x}|$, where $K(\vec{v})$ is a kernel that weights a point $\vec{v}$ in the cone by $$K(\vec{v}(r, \alpha)) = \frac{\exp(-\alpha^2/2\sigma^2)}{r\cos(\alpha)}.$$

According to a further aspect of the invention, the method includes incrementing a weight image $\Sigma(\vec{x})$ for each voxel vote according to $\Sigma(\vec{x}+\vec{v}) = (\vec{x}+\vec{v}) + \Sigma(\vec{v})$, and after voting, normalizing the radius image by dividing by the weight image.

According to a further aspect of the invention, selecting candidates for a second vote image comprises finding, for each voxel $\vec{x}$ in the subregion, a voxel, $\vec{v}_{max}$ within the cone whose tip is attached to voxel $\vec{x}$ that has the maximum number of votes, and forming the second voting image $V'(\vec{x})$ by voting for those $\vec{v}_{max}$ voxels whose distance to the cone tip $\vec{x}$ is approximately equal to the normalized radius image value for that point, according to $V'(\vec{x}+\vec{v}_{max}) = V'(\vec{x}+\vec{v}_{max}) + K(\vec{v}_{max})\log(|\nabla I(\vec{x})|)$.

According to a further aspect of the invention, the method includes normalizing the second voting image by dividing by the weight image.

According to a further aspect of the invention, reconfiguring the subregion as a graph further comprises including two additional nodes, {s,t} representing a source and a sink respectively, linking the source and sink to the voxel nodes p∈P forming t-link edges, t-link weights in the graph are determined by the second vote image, and the n-link weights are determined by the subregion's intensity and gradient.

According to a further aspect of the invention, the min-cut algorithm minimizes an energy of the form $$E(f) = \sum_{p \in P} D_p(f_p) + \sum_{p,q \in N} V_{p,q}(f_p, f_q),$$

where f=[0,1] is a label distinguishing a vessel node from a non-vessel node, $V_{p,q}$ is a weight for an n-link connecting voxel nodes p, q, $$V_{p,q \in N} = C_1 \exp\left(\frac{\left((I(p)-I(q))^2 + \cos^{-1}\left(\frac{\nabla I(p)}{\|\nabla I(p)\|} \cdot \frac{\nabla I(q)}{\|\nabla I(q)\|}\right)\right)}{2\sigma^2}\right),$$

$D_p$ is a t-ink weight defined as $D_p = C_2 A(p)$ for voxel nodes p connected to the source node, and $D_p = C_2(1-A(p))$ for voxel nodes p connected to the sink node, $\sigma^2$, $C_1$ and $C_2$ are predetermined constants, and A(p) is a normalized second vote image evaluated for node p.

According to another aspect of the invention, there is provided a method for segmenting tubular structures in digital medical images, including extracting a subregion of a digital medical image volume containing a vessel of interest, having each voxel in the subregion vote on a vessel center where votes are cast in a conical region whose tip is on the voxel and whose central axis is oriented in a gradient direction, where the votes are weighted proportional to the intensity of the gradient at a cone voxel and how close the cone voxel is to the central axis of the cone to create a first vote image, and are weighted proportional to the distance between the subregion point and the cone point to create a radius image, searching the first vote image for a most popular centerpoint candidate within the conical region for each subregion voxel, voting for the centerpoint candidate if the distance to the centerpoint candidate from the point is in agreement with the value for a corresponding location in the radius image to form a second vote image, constructing a graph from the second vote image, searching the graph for an optimal path from a user supplied endpoint to any point on a vessel surface to recover the vessel of interest.

According to a further aspect of the invention, extracting a subregion comprises segmenting a left ventricle from the image volume using an initial point found by searching for bright circular regions at an orientation commonly assumed by the left ventricle, determining a second point in an aorta based on spatial and intensity priors relative to the left ventricle segmentation, and extracting an aorta mask, $T(\vec{x})$ by finding a connected component of voxels with intensities crossing a threshold, where the threshold is computed using the second point inside the aorta.

According to a further aspect of the invention, the method includes incrementing a weight image for each voxel vote by a weighting factor associated with the cone defined by $$K(\vec{v}(r,\alpha)) = \frac{\exp(-\alpha^2/2\sigma^2)}{r\cos(\alpha)},$$

where voxel $\vec{v}$ is within the cone. $\alpha:[-\alpha_{max},\alpha_{max}]$ is an angle $\vec{v}$ forms with the image gradient vector, $$r:\left[0, \frac{h}{\cos(\alpha_{max})}\right]$$

is a length of a vector represented by $\vec{v}$ and $\sigma^2$ is a predetermined constant, and normalizing the second voting image by dividing by the weight image to form an axial symmetry image.

According to a further aspect of the invention, vertices V={B,H,U} of the graph are defined as B={$\vec{x}$: $\nabla T(\vec{x})>\epsilon^2$} where $T(\vec{x})$ is the aorta mask, H={$\vec{x}$: $A(\vec{x})>\epsilon_3$}, the axial symmetry voxels over a threshold; and U is a user supplied endpoint, edges $E_{ij}$ are created between any two vertices i, j which are less than a predetermined distance apart, and the edges are weighted by line integral between two vertices through a multiplicative inverse of the axial symmetry image, $$w(E_{ij}) = \int_{C_{ij}} \frac{1}{A'(s)} ds,$$

where $C_{ij}$ is a line segment connecting vertices $v_i$ and $v_j$.

According to a further aspect of the invention, the graph is searched using Dijkstra's algorithm.

According to another aspect of the invention, there is provided a program storage device readable by a computer, tangibly embodying a program of instructions executable by the computer to perform the method steps for segmenting tubular structures in digital medical images.

DETAILED DESCRIPTION OF EXEMPLARY EMBODIMENTS

Exemplary embodiments of the invention as described herein generally include systems and methods for segmentation of vascular structures in volumetric image datasets. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 1:
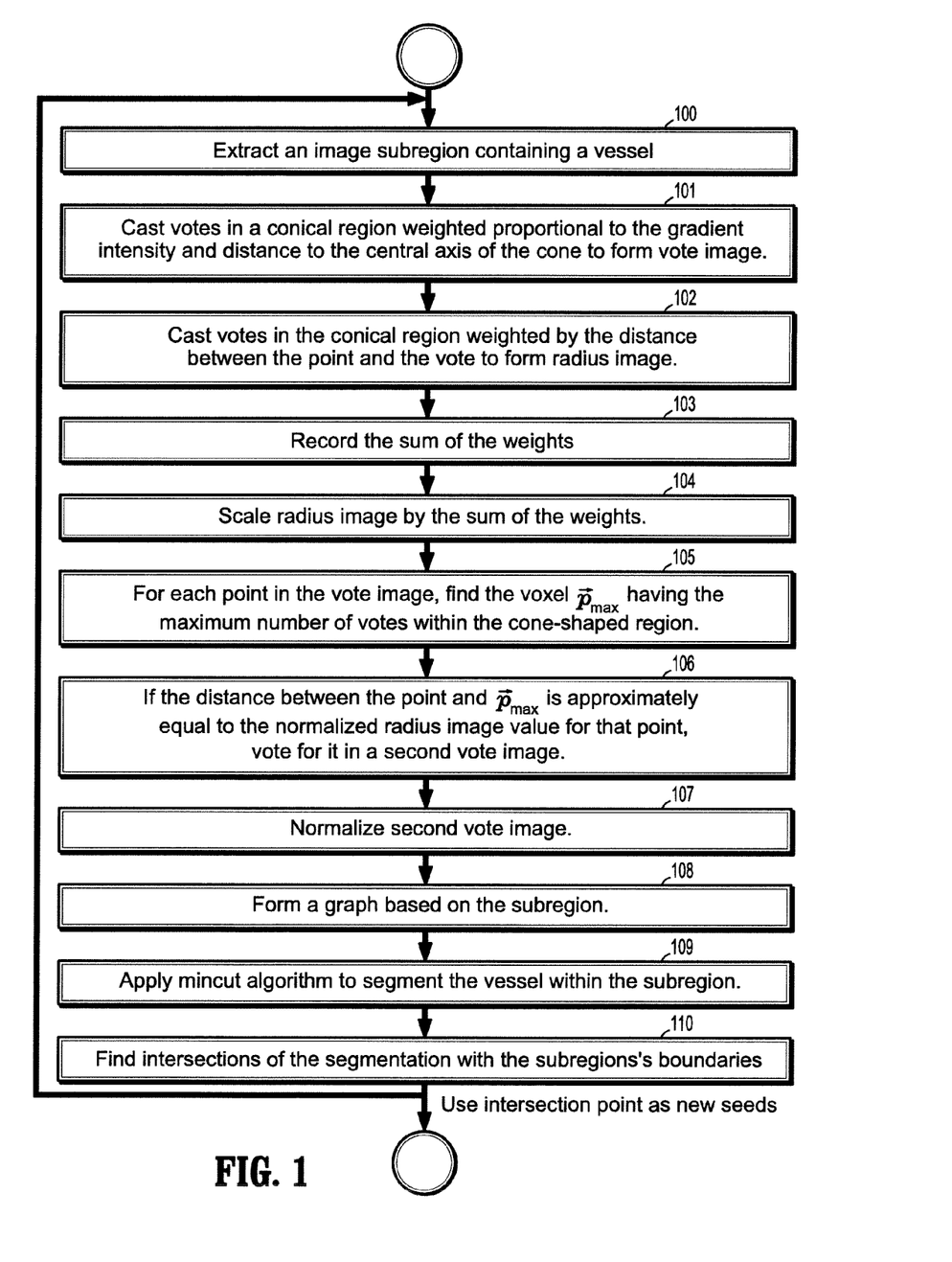
FIG. 1 is a flowchart of a method for segmentation of vascular structures in volumetric image datasets, according to an embodiment of the invention.

A flowchart of a vessel segmentation method according to an embodiment of the invention is presented in FIG. 1. A method begins at step 100 by extracting a subregion of the image containing a vessel of interest, either semi-automatically, starting from a user supplied seed point, or automatically. Then, a two-stage Hough-like election scheme is applied to the volume which enhances axial symmetries. In a first stage, the image is convolved with a gradient and each point votes on the vessel center. At step 101, votes are cast in a conical region (with the tip of the cone on the point and its central axis oriented in the gradient direction). The votes are weighted proportional to the intensity of the gradient at the point and how close it is to the central axis of the cone. This creates the "standard Hough" image. In the same manner, a "radius Hough" image is also created at step 102. That is, instead of each vote being a simple weighted yes/no, the weighted radius (the distance between the point and the vote) is recorded. The sum of the weights is additionally recorded at step 103 so that the "radius Hough" image can be scaled at step 104 to a "normalized radius Hough" image.

In a second stage, agreement is sought between the "standard Hough" and the "normalized radius Hough" images in a second round of voting. For each point in the volume, a same conical region of interest as before is used, and the "standard Hough" image is searched at step 105 for the most popular location within the region, the centerpoint candidate. If, at step 106, the distance to the centerpoint candidate from the point is in agreement with the value for this location in the "normalized radius Hough" image, the candidate receives a vote. The resulting Hough is normalized at step 107 to form the Axial Symmetry Image.

Finally, at step 108, a graph is formed based on the subregion. At step 109, a mincut algorithm is applied to segment the vessel within the subregion. Intersections of the segmentation with the subregions's boundaries are detected at step 110, and can serve as starting points for another iteration, returning to step 100 to extract a new subregion. A graph can also be constructed from the Axial Symmetry Image and searched for an optimal path from a user supplied endpoint to any point on the aorta surface (an ostium) to recover the vessel of interest.

Each of these steps is described in detail below.

Methods

A semi-automatic subregion extraction, step 100 of FIG. 1, starts with a user supplied seed point and classification of the target vessel in one of three size categories (coronary, carotid or aorta). A cubic subregion, $I(\vec{x})$, of the image centered on this seed is extracted. The size of the subregion, $$x_i = \left[\frac{-d}{2}, \frac{d}{2}\right], i = 0, 1, 2,$$

is dependent on the vessel category, as the aorta requires a larger subregion than the coronaries.

An aorta subregion can be automatically extracted as follows. First, an aorta mask, $T(\vec{x})$, is extracted automatically from the image volume by first finding the left ventricle. A fast variant of the isoperimetric algorithm is used for only segmenting a mask. The mask in this case can be generated by finding a connected component of voxels with intensities crossing a threshold. This threshold was computed using an initial point given inside the aorta. The initial point in the aorta was determined based on spatial and intensity priors relative to left ventricle segmentation. Note that, in other embodiments of the invention, the initial point could be user supplied. The left ventricle was also segmented using the variant of the isoperimetric algorithm, with an initial point given by searching for bright circular regions at the orientation commonly assumed by the left ventricle. This procedure for segmenting the aorta and left ventricle produced a correct segmentation in all test datasets.

Next, three separate images of the same dimensions as the subregion $I(\vec{x})$ above are created. These are: a vote image, $V(\vec{x})$, for storing the votes cast for vessel centerpoints, a radius image. $R(\vec{x})$, for computing the expected vessel cross-sectional radii, and $\Sigma(\vec{x})$, a sum image which will be used to normalize the radius image. To collect the votes, the image, $I(\vec{x})$, is convolved with a cone-shaped kernel.

FIGS. 2(a)-(b) illustrate conical voting kernels, according to an embodiment of the invention. FIG. 2(a) shows a kernel, based at the point $\vec{x}$, having angular extent $\alpha_{max}$ and oriented in the direction of the image gradient $$\frac{\nabla I(\vec{x})}{\|\nabla I(\vec{x})\|}$$

with a maximal height, h. The values of h and $\alpha_{max}$ may be determined empirically. A point $\vec{v}$ lies within the voting region. According to an embodiment of the invention, the gradient direction is used for performance reasons to orient the cone. However, in other embodiments of the invention, the direction could come from the two eigenvalues associated with the two largest eigenvectors of the Hessian matrix at $\vec{x}$.

Point $\vec{v}$, within the cone may be described with respect to $\vec{x}$ as:

$$\vec{v} = \vec{\Theta}\left(\frac{\nabla I(\vec{x})}{\|\nabla I(\vec{x})\|}\right)[r\cos(\theta)\sin(\alpha), r\sin(\theta)\sin(\alpha), r\cos(\theta)]^T, \quad (1)$$

where $$\vec{\Theta}\left(\frac{\nabla I(\vec{x})}{\|\nabla I(\vec{x})\|}\right)$$

is a rotation matrix aligning the central axis of the cone, $\vec{Z}$, with the image gradient direction; $\alpha:[-\alpha_{max}, \alpha_{max}]$ is the angle $\vec{v}$ forms with the image gradient vector;

$$r:\left[0, \frac{h}{\cos(\alpha_{max})}\right],$$

is the length of the vector, $\vec{v}$; and $\theta:[0, 2\pi]$ serves as a sweep out parameter. These parameters form the conical region, $$C\left(\vec{x}\alpha_{max}, h, \frac{\nabla I(\vec{x})}{\|\nabla I(\vec{x})\|}\right).$$

The kernel K weights a point, $\vec{v}$, by $$K(\vec{v}(r, \alpha)) = \frac{\exp(-\alpha^2/2\sigma^2)}{r\cos(\alpha)}, \quad (2)$$

where σ is determined empirically. Since it is assumed that a shortest line segment from the centerpoint of the vessel to the vessel wall is perpendicular to the vessel wall, this weight function penalizes angles deviating from the gradient. Also, the larger the radius, the more pixels there are to vote for that centerpoint. The $$\frac{1}{r\cos(\alpha)}$$

term compensates for this effect.

Voting comprises a two stage process. A first stage, step 101, begins by initializing the vote, radius, and sum images: $V(\vec{x})=0, \forall \vec{x}, R(\vec{x})=0, \forall \vec{x}, \Sigma(\vec{x})=0, \forall \vec{x}$. Then, for each $\vec{x}$ in $I(\vec{x})$, the cone-shaped kernel is aligned with the image gradient, $$\frac{I(\vec{x})}{\|I(\vec{x})\|},$$

the cone is swept out, and the vote image is incremented with kernel values weighted by the log of the strength of the gradient at $\vec{x}$:

$$V(\vec{x}+\vec{v})=V(\vec{x}+\vec{v})+K(\vec{v})\log(|\nabla I(\vec{x})|), \qquad (3)$$

where $$\left(-\frac{d}{2},-\frac{d}{2},-\frac{d}{2}\right) \le (\vec{x}+\vec{v}) \le \left(\frac{d}{2},\frac{d}{2},\frac{d}{2}\right).$$

In this way, each voxel casts multiple votes for where the centerpoint of the vessel is. On the vessel wall, voxels will cast their votes for a centerpoint which is in the direction (more or less) of the image gradient. Since the image gradient is strong those votes will have stronger weights. In a similar fashion, at step 102, votes are collected for the approximate radius of the vessel:

$$R(\vec{x}+\vec{v})=R(\vec{x}+\vec{v})+K(\vec{v})|\vec{v}-\vec{x}|. \qquad (4)$$

Figure 2:
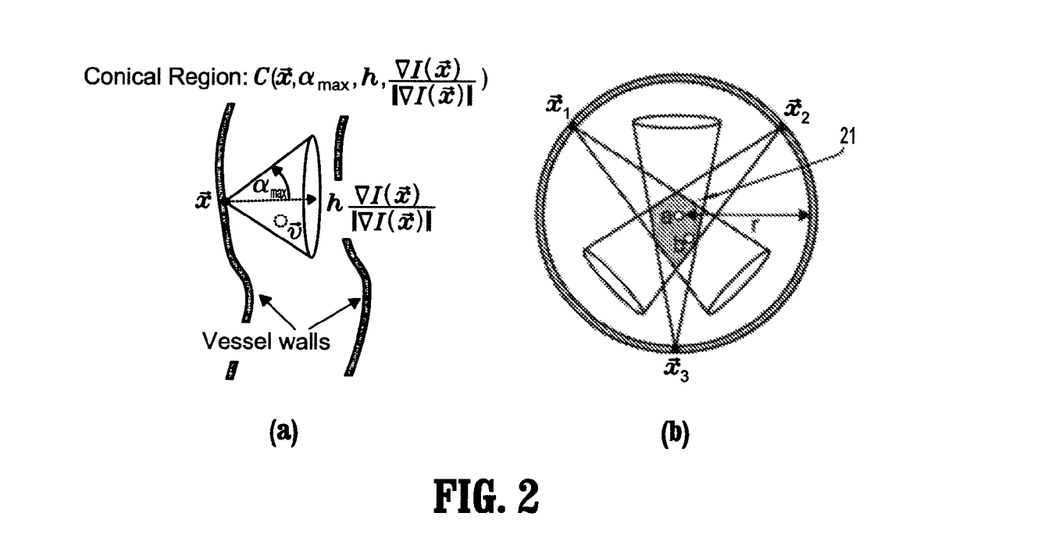
FIG. 2(a) shows a conical voting region based on a voxel, according to an embodiment of the invention.
FIG. 2(b) shows a view of the vessel cross-section with radius r, according to an embodiment of the invention.

FIG. 2(*b*) is a view of the vessel cross-section with radius $\vec{r}$. Voxels are shown voting for a centerpoint of the vessel. The gray region 21 contains the most popular candidates. In the corresponding radius image, $R(\vec{x})$, point $\vec{a}$, receives weighted increments of value r for all three points $\vec{x}_1, \vec{x}_2, \vec{x}_3$. At point $\vec{b}$, on the other hand, the weighted increments will be different from r: less r than for $\vec{x}_2$ and $\vec{x}_3$, greater than r for $\vec{x}_1$.

At step 103, the sum of the weights is stored in $\Sigma(\vec{x})$ for normalization:

$$\Sigma(\vec{x}+\vec{v})=\Sigma(\vec{x}+\vec{v})+K(\vec{v}) \qquad (5)$$

Finally, at step 104, the radius image is divided by the sum image $\Sigma(\vec{x})$ to create a normalized radius image $R'(\vec{x})$.

A second stage begins by initializing a second vote image, $V'(\vec{x})$ to zero: $V'(\vec{x})=0, \forall \vec{x}$. At step 105, for each $\vec{x}$ in $V(\vec{x})$, one finds the voxel, $\vec{v}_{max}$, which has the maximum number of votes within the cone-shaped region emanating from $\vec{x}$:

$$\vec{v}_{max} = \left\{ \vec{v}_i : V(\vec{x}+\vec{v}_i) \ge V(\vec{x}+\vec{v}), \forall \vec{v} \in C\left(\vec{x}, \alpha_{max}, h, \frac{\nabla I(\vec{x})}{\|\nabla I(\vec{x})\|}\right) \right\} \qquad (6)$$

If, at step 106, the distance between $\vec{x}$ and $\vec{v}_{max}$, is approximately equal to the normalized radius image value for that point, $|R'(\vec{v})-\|\vec{v}_{max}-\vec{x}\|\|<\epsilon_1$ for a positive $\epsilon_1 \approx 0$, then a vote is cast for it in the second vote image:

$$V'(\vec{x}+\vec{v}_{max})=V'(\vec{x}+\vec{v}_{max})+K(\vec{v}_{max})\log(|\nabla I(\vec{x})|). \qquad (7)$$

Figure 3:
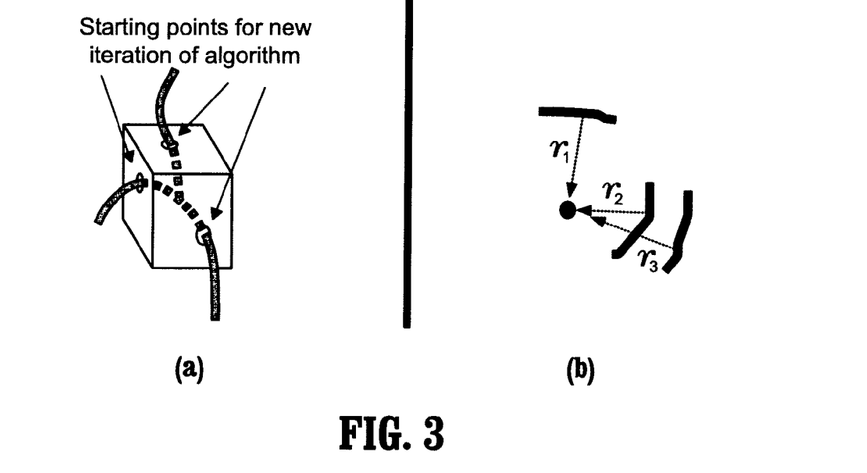
FIG. 3(a) illustrates starting points for a tracking scheme according to an embodiment of the invention.
FIG. 3(b) illustrates the role of the normalized radius image, according to an embodiment of the invention.

FIG. 3(*b*) illustrates the role of the normalized radius image, $R'(\vec{x})$. Although the point shown will have several votes from the gradient edges in the first vote image, each edge corresponds to a different radius in $R'(\vec{x})$. This point will not be selected as a centerpoint. Once all votes are tallied, $V'(\vec{x})$ is normalized at step 107 by dividing by $\Sigma(\vec{x})$ to form an axial symmetry image, $A(\vec{x})$. High values in $A(\vec{x})$ indicate increased likelihood of a point being a centerpoint.

The subregion $I(\vec{x})$ is next formulated at step 108 as an undirected graph where voxels, $\vec{x}$, correspond to nodes p∈P. A 26-connected neighborhood system N of edges, E comprising pairs {p,q}∈N connects these nodes. Two additional nodes, {s,t} representing source and sink respectively are included and linked to the nodes p∈P forming edges $E_{s,t}$. A labeling, f, is sought distinguishing vessel (f=1) from non-vessel (f=0) on the graph which minimizes an energy of the form:

$$E(f) = \sum_{p \in P} D_p(f_p) + \sum_{p,q \in N} V_{p,q}(f_p, f_q). \qquad (8)$$

The $V_{p,q}$ term represents the consistency between neighboring nodes p, q (n-links):

$$V_{p,q \in N} = C_1 \exp\left( \frac{\left((I(p)-I(q))^2 + \cos^{-1}\left(\frac{\nabla I(p)}{\|\nabla I(p)\|} \cdot \frac{\nabla I(q)}{\|\nabla I(q)\|}\right)\right)}{2\sigma^2} \right), \qquad (9)$$

penalizing the differences in intensity and gradient direction. The $D_p$ term represents the confidence that a node should be labeled as vessel (t-links):

$$D_p = C_2 A(p) \text{ for } \{p,s\} \in E_{s,t}; \qquad (10a)$$

and $$D_p = C_2(1-A(p)) \text{ for } \{p,t\} \in E_{s,t}. \qquad (10b)$$

The constants $C_1$ and $C_2$ may be determined empirically.

At step 109, to find the globally optimal partitioning of the graph, a maxflow/mincut algorithm is used. Exemplary maxflow/mincut algorithms include the well known Ford-Fulkerson algorithm, and its variants, such as the Edmonds-Karp algorithm. Segmentation can be accomplished in polynomial time as each node is connected only to its nearest neighbors.

Once the vessel is segmented within the subregion, the intersections between the segmentation and the subregion boundaries are detected at step 110. In image coordinates, this is $$X_s = \left\{ \vec{x}_{f=1} \middle| \left(x_i = \frac{d}{2}\right) \cap \left(x_i = \frac{d}{2}\right), i \in 0, 1, 2 \right\}. \qquad (11)$$

A connected component analysis is performed on $X_s$ and components with size above a threshold are designated as vessel endpoints. These endpoints serve as seeds for extracting a new subregion in a next iteration of the segmentation, returning to step 100. Each successive new subregion serves to track the vessel's path. FIG. 3(a) illustrates a tracking scheme for an algorithm according to an embodiment of the invention, where intersections of the segmentation with the subregion boundaries define new starting points.

For aorta extraction, a graph G={V, E} is created based on the axial symmetry image $A(\vec{x})$ which will be searched to find the aorta. The vertices V={B,H,U} are: B=$\{\vec{x}:\nabla T(\vec{x}) > \epsilon_2\}$, the aorta surface points, where $T(\vec{x})$ is the aorta mask; H=$\{\vec{x}:A(\vec{x}) > \epsilon_3\}$, the axial symmetry voxels over a threshold; and U=$\{\vec{u}\}$, a user supplied distal endpoint. The thresholds $\epsilon_2$, $\epsilon_3$ may be determined empirically from the aorta. The edges, E, are created between any two vertices which are less than or equal to a predetermined distance apart in world coordinates, to facilitate bridging occlusions shorter than that length. According to an embodiment of the invention, this predetermined distance is about 2 centimeters. Edge weights are computed as the line integral (again in world coordinates) between two vertices through the multiplicative inverse of the axial symmetry volume, $$w(E_{ij}) = \int_{C_{ij}} \frac{1}{A'(s)} ds, \qquad (12)$$

where $C_{ij}$ is the line segment connecting vertex $v_i$ and $v_j$.

According to an embodiment of the invention, Dijkstra's algorithm for finding a shortest path between 2 nodes on a graph is applied on G starting from $\vec{u}$, the user supplied endpoint, to any point on the aorta surface to recover the vessel of interest. The point on the aorta will be an ostium if the segmentation is correct. It is to be understood that the use of Dijkstra's algorithm is exemplary and non-limiting, and any algorithm for finding a shortest path between 2 nodes on a graph is within the scope of an embodiment of the invention.

Results

Figure 4:
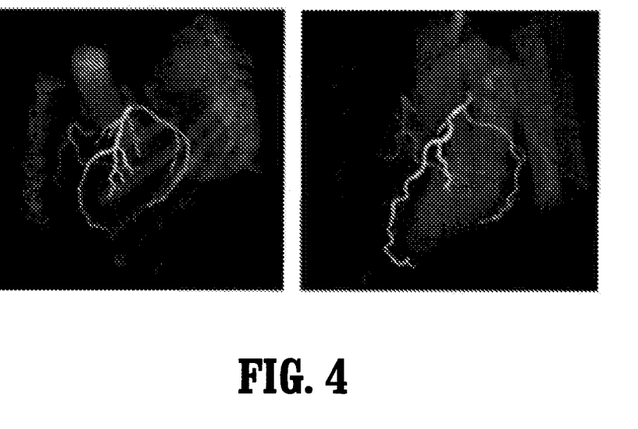
FIG. 4 depicts views of two patients showing results for both the left and right trees, according to an embodiment of the invention.
Figure 5:
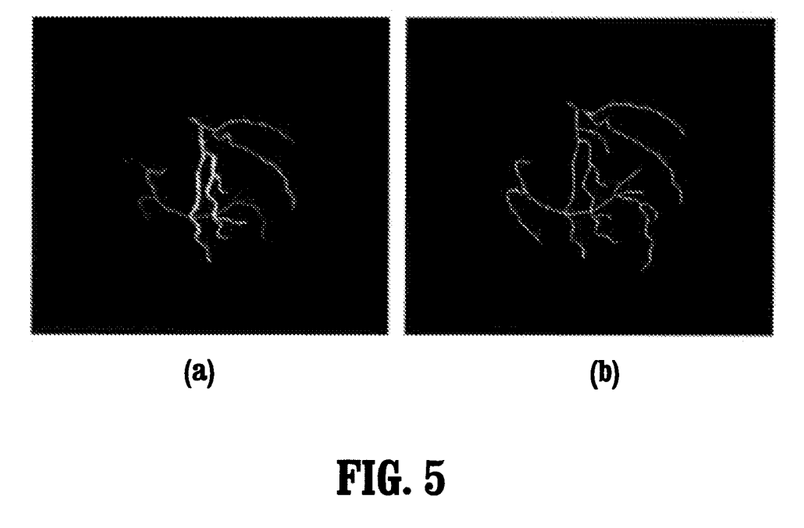
FIGS. 5(a)-(b) compare depict a vessel tree segmented by a method according to an embodiment of the invention with a manually segmented ground truth vessel tree.
Figure 6:
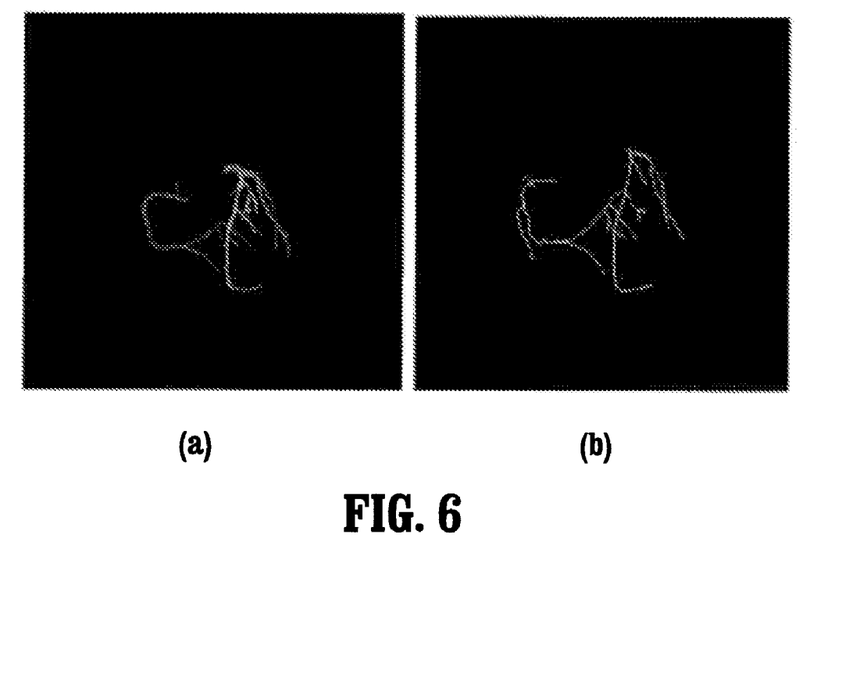
FIGS. 6(a)-(b) compare depict a vessel tree segmented by a method according to an embodiment of the invention with a manually segmented ground truth vessel tree.
Figure 7:
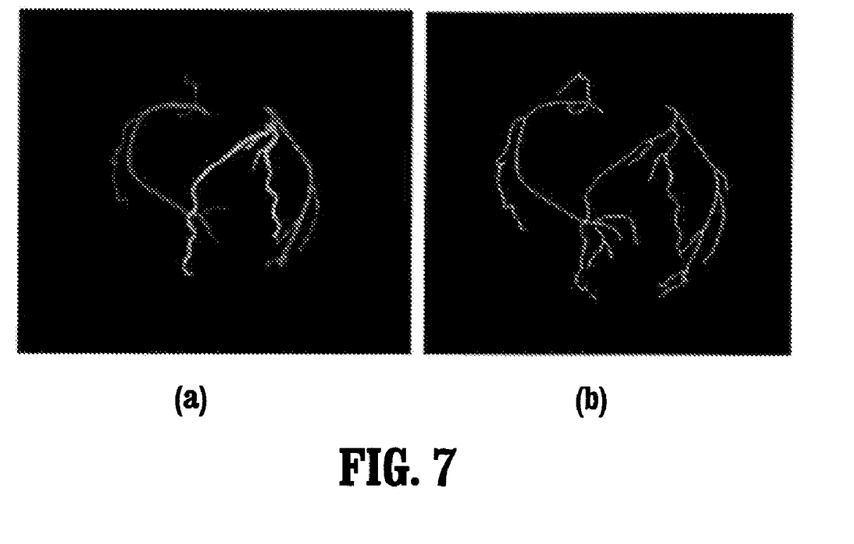
FIGS. 7(a)-(b) compare depict a vessel tree segmented by a method according to an embodiment of the invention with a manually segmented ground truth vessel tree.
Figure 8:
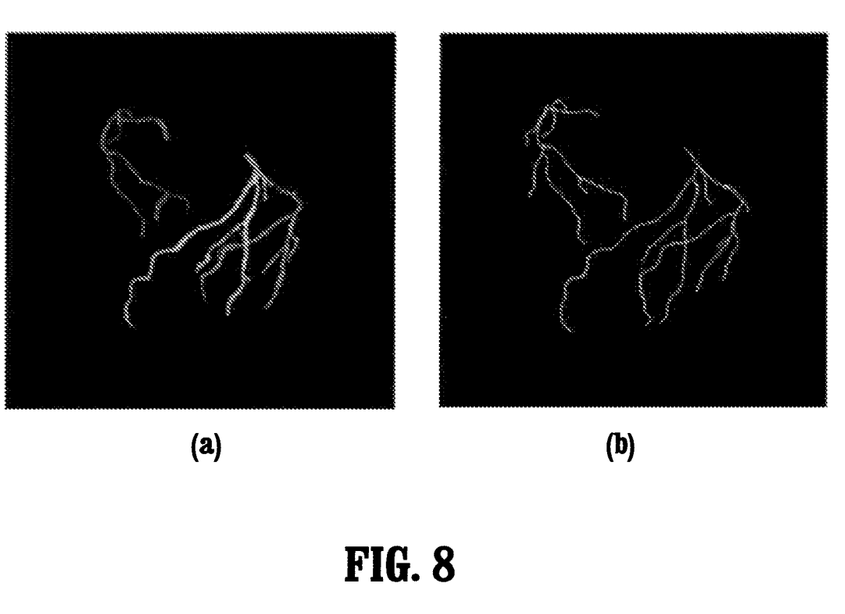
FIGS. 8(a)-(b) compare depict a vessel tree segmented by a method according to an embodiment of the invention with a manually segmented ground truth vessel tree.

A vessel segmentation algorithm according to an embodiment of the invention was validated on 70 coronary trees (left and right), using coronary CT angiography datasets from 35 patients, with seeds placed at the ostium of the Left Main and Right Coronary Arteries. Exemplary parameters for this embodiment were: subregion size=48×48×48, $\alpha_{max}=\pi/10$, h=4 mm, $\sigma$=32, $C_1$=10, $C_2$=200. All vessels were manually segmented by experts for ground truth comparisons. Algorithms according to embodiments of the invention were tested on all vessels of radius greater than 0.6 mm. The sensitivity was 90.1%±9.3% (mean±standard deviation), i.e., on average ~90% of the voxels labeled as ground truth were detected, while the positive predictive value was 95.4%±7.6%, i.e., ~95% of vessel voxels were correctly classified. FIG. 4 presents exemplary views from two patients showing results for both the left and right trees. FIGS. 5(a)-(b), FIGS. 6(a)-(b), FIGS. 7(a)-(b), and FIGS. 8(a)-(b) each depict a vessel tree segmented by a method according to an embodiment of the invention in the (a) view, and a manually segmented ground truth vessel tree in the (b) view. Average execution time was 95 s using a dual core 2.6 Ghz CPU, with 2 gigabytes of RAM. This execution time is relatively fast because the axial symmetry calculation is only performed on the small cubical subregion extracted in a first step of a method according to an embodiment of the invention. The vessel is tracked from the initial subregion, and subsequent small cubical subregions are extracted as the vessel is tracked. Thus, only a small fraction of an entire image is processed.

An axial symmetry based vessel extraction algorithm when applied to a whole image volume is computationally expensive. In this case, an automatic cardiac extraction algorithm can be applied to isolate the heart. Then, the image volume is subdivided into sub-cubes. Any cube which contains some part of the heart is included in the processing. Even so, the creation of the axial symmetry image typically takes up to five minutes. Once this is calculated, however, extraction of a vessel, once an endpoint is selected, can be performed in a few seconds.

A coronary artery centerline tracking method according to an embodiment of the invention can be compared to manually annotated centerlines in cardiac CTA datasets. For this purpose, the centerline of a coronary artery in a CTA scan may be defined as the curve that passes through the center of gravity of the lumen in each cross-section of an image volume. The start point of a centerline is defined as the center of the coronary ostium (i.e. the point where the coronary artery originates from the aorta) and the end point as the most distal point where the artery is still distinguishable from the background. The centerline is smoothly interpolated if the artery is partly indistinguishable from the background, e.g. in case of a total occlusion or imaging artifacts.

The CTA data used for the comparison was acquired in the Erasmus MC, University Medical Center Rotterdam, The Netherlands. Thirty-two datasets were randomly selected from a series of patients who underwent a cardiac CTA examination between June 2005 and June 2006. Twenty datasets were acquired with a 64-slice CT scanner and twelve datasets with a dual-source CT scanner (Sensation 64 and Somatom Definition, Siemens Medical Solutions, Forchheim, Germany).

Figure 10:
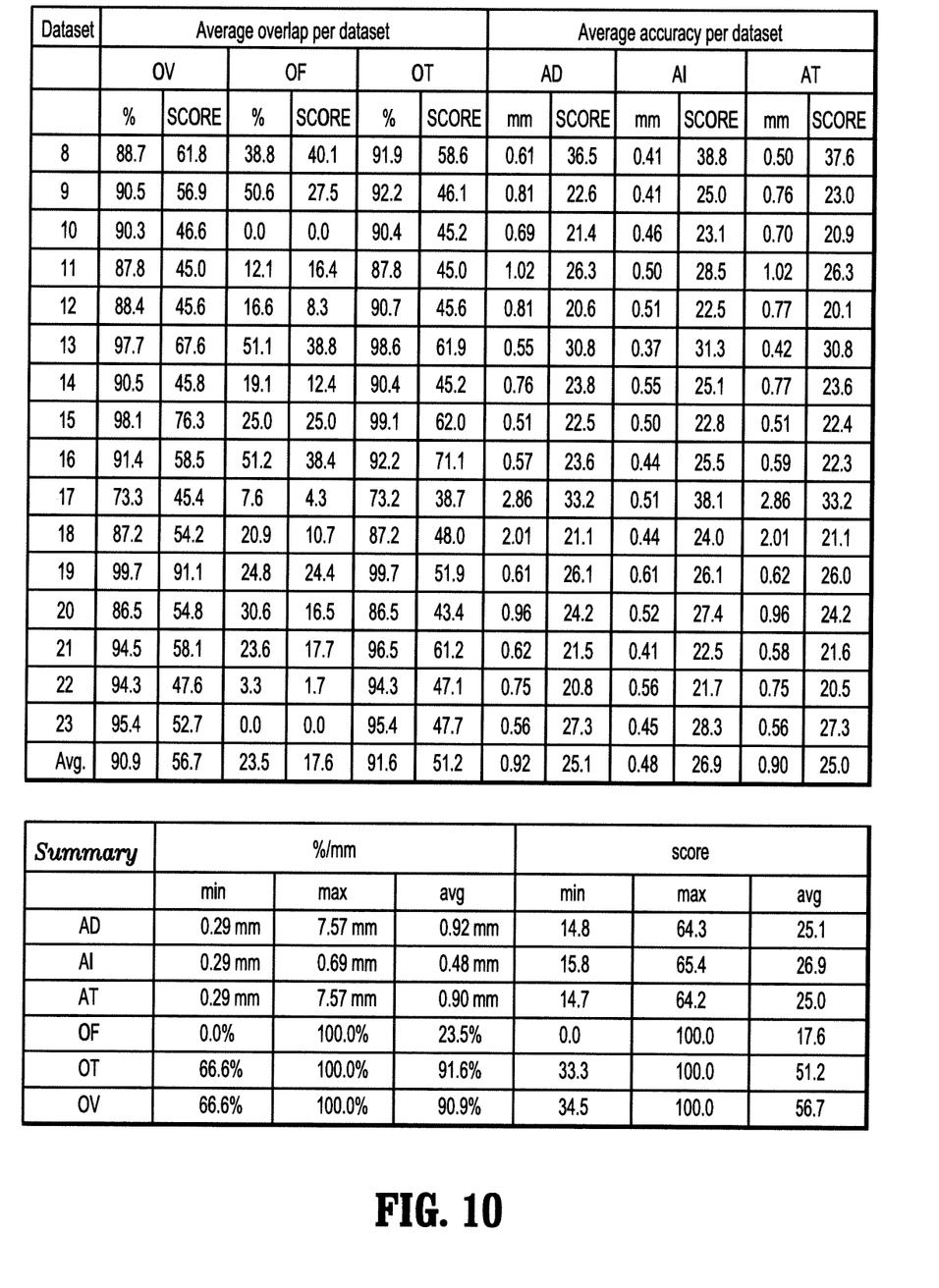
FIG. 10 presents tables of test results of a coronary artery centerline tracking method according to an embodiment of the invention on sixteen datasets as compared with manually annotated results.

FIG. 10 presents 2 tables of test results of a coronary artery centerline tracking method according to an embodiment of the invention on sixteen datasets as compared with manually annotated results. The upper table presents several overlap and accuracy measurement results for each of the datasets, and the lower table presents summary results for each measurement. The overlap and accuracy measures are explained next.

Quality measures for extracted centerlines are based on a labeling of points on the centerlines as true positive, false negative or false positive. This labeling, in turn, is based on a correspondence between the reference standard annotated centerline and an evaluated centerline. A point of the reference standard is marked as true positive $TPR_{ov}$ if the distance to at least one of the connected points on the evaluated centerline is less than the annotated radius and false negative $FN_{ov}$ otherwise. A point on the evaluated centerline is marked as true positive $TPM_{ov}$ if there is at least one connected point on the reference standard at a distance less than the radius defined at that reference point, and it is marked as false positive $FP_{ov}$ otherwise.

Three different overlap measures are used.

Overlap (OV) represents the ability to track the complete vessel annotated by the human observers. It is defined as:

$$OV = \frac{TPM_{ov} + TPR_{ov}}{TPM_{ov} + TPR_{ov} + FN_{ov} + FP_{ov}}.$$

Overlap until first error (OF) determines how much of a coronary artery has been extracted before making an error. It is defined as the ratio of the number of true positive points on the reference before the first error ($TPR_{of}$) and the total number of reference points ($TPR_{of}+FN_{of}$):

$$OF = \frac{TPR_{of}}{TPR_{of} + FN_{of}}.$$

The first error is defined as the first $FN_{ov}$, point when traversing from the start of the reference standard to its end while ignoring false negative points in a beginning segment of the reference standard. The threshold for the beginning segment is based on the average diameter annotated at the beginning of all the reference standard centerlines.

Overlap with the clinically relevant part of the vessel (OT) gives an indication of how well the method is able to track a section of the vessel that is assumed to be clinically relevant. The point closest to the end of the reference standard with a radius larger than or equal to predetermined threshold is determined. Only points on the reference standard between this point and the start of the reference standard are taken into account and only points on the (semi-)automatic centerline connected to these reference points are used when defining the true positives ($TPM_{ot}$ and $TPR_{ot}$), false negatives ($FN_{ot}$) and false positives ($FP_{ot}$). The OT measure is calculated as follows:

$$OT = \frac{TPM_{ot} + TPR_{ot}}{TPM_{ot} + TPR_{ot} + FN_{ot} + FP_{ot}}.$$

Three different measures are used to assess the accuracy of coronary artery centerline extraction algorithms.

Average distance (AD) is the average distance between the reference standard and the automatic centerline. The average distance is defined as the summed length of all the connections between the two equidistantly sampled centerlines, divided by the number of connections.

Average distance inside vessel (AI) represents the accuracy of centerline extraction, provided that the evaluated centerline is inside the vessel. The measure is calculated in the same way as AD, except that connections that have a length larger than the annotated radius at the connected reference point are excluded.

Average distance to the clinically relevant part of a vessel (AT) represents how well the method can track vessels segments that are clinically relevant. The difference with the AD measure is that the lengths and scores for the connections that connect $TPM_{ot}$, $TPR_{ot}$, $FN_{ot}$, and $FP_{ot}$ points are averaged.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
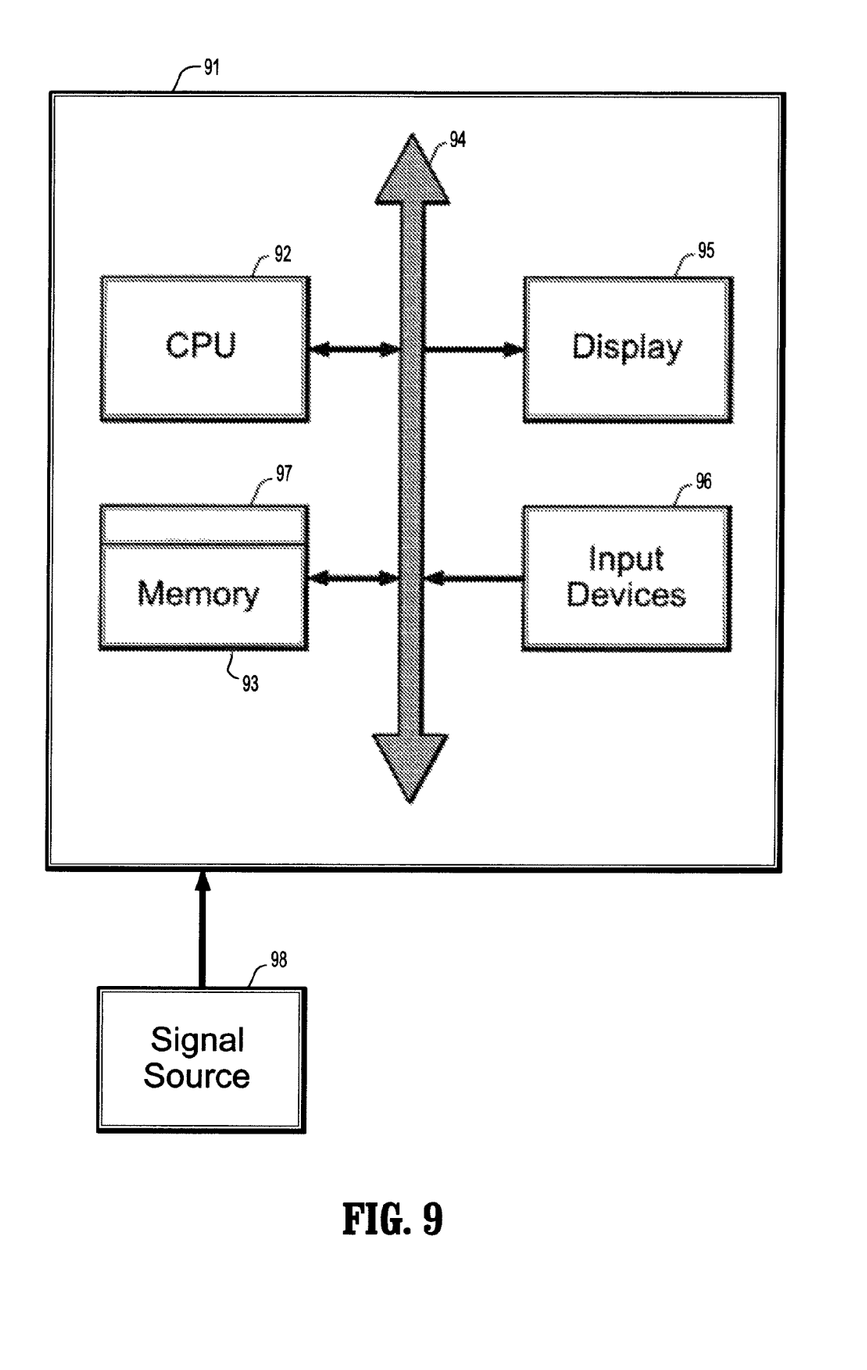
FIG. 9 is a block diagram of an exemplary computer system for implementing a method for segmentation of vascular structures in volumetric image datasets, according to an embodiment of the invention.

FIG. 9 is a block diagram of an exemplary computer system for implementing a method for segmentation of vascular structures in volumetric image datasets according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for segmenting tubular structures in digital medical images, said method executed by a computer comprising the steps of:

extracting a subregion from a 3-dimensional (3D) digital medical image volume containing a vessel of interest;

for each voxel in the subregion, identifying potential vessel centerpoints by attaching to each voxel a tip of a 3D cone that is oriented in the direction of the voxel's image gradient and having each voxel within the 3D cone vote for those voxels most likely to belong to a vessel centerline;

selecting candidates for a second vote image that are both popular according to a first vote image, as well as being consistently voted upon by a radius image;

reconfiguring the subregion as a graph wherein each voxel is represented by a node that is connected to 26 nearest neighbors by n-link edges; and applying a min-cut algorithm to segment the vessel within the subregion.

2. The method of claim 1, wherein the segmented vessel includes branches.

3. The method of claim 1, further comprising detecting intersections of the segmented vessel with the subregion's boundaries, wherein intersection voxels serve as starting voxels for extracting a new subregion overlapping with the current subregion, wherein said new subregion serves to track the vessel's centerline.

4. The method of claim 1, wherein said subregion is a cubic subregion of size $$x_i = \left[\frac{-d}{2}, \frac{d}{2}\right]$$

for each axis i centered on a user supplied starting voxel wherein d is predetermined based on a vessel category.

5. The method of claim 1, wherein a voxel $\vec{v}$ within said 3D cone is defined with respect to said cone tip voxel $\vec{x}$ as:

$$\vec{v} = \vec{\Theta}\left(\frac{\nabla I(\vec{x})}{\|\nabla I(\vec{x})\|}\right)[r\cos(\theta)\sin(\alpha), r\sin(\theta)\sin(\alpha), r\cos(\theta)]^T,$$

wherein $$\frac{\nabla I(\vec{x})}{\|\nabla I(\vec{x})\|}$$

is the image gradient, $$\vec{\Theta}\left(\frac{\nabla I(\vec{x})}{\|\nabla I(\vec{x})\|}\right)$$

is a rotation matrix aligning the central axis of the cone with the image gradient direction, $\alpha:[-\alpha_{max},\alpha_{max}]$, is an angle $\vec{v}$ forms with the image gradient vector, $$r:\left[0, \frac{h}{\cos(\alpha_{max})}\right],$$

is a length of a vector represented by $\vec{v}$, and $\theta: [0, 2\pi]$ is a sweep out parameter.

6. The method of claim 5, wherein voting comprises incrementing a first vote image as $V(\vec{x}+\vec{v})=V(\vec{x}+\vec{v})+K(\vec{v})\log(|\nabla I(\vec{x})|)$ for each voxel $\vec{v}$ in said cone, wherein $$\left(-\frac{d}{2}, -\frac{d}{2}, -\frac{d}{2}\right) \le (\vec{x}+\vec{v}) \le \left(\frac{d}{2}, \frac{d}{2}, \frac{d}{2}\right),$$

incrementing a radius image as $R(\vec{x}+\vec{v})=R(\vec{x}+\vec{v})+K(\vec{v})|\vec{v}-\vec{x}|$, wherein $K(\vec{v})$ is a kernel that weights a point $\vec{v}$ in the cone by $$K(\vec{v}(r,\alpha)) = \frac{\exp(-\alpha^2/2\sigma^2)}{r\cos(\alpha)}.$$

7. The method of claim 6, further comprising incrementing a weight image $\Sigma(\vec{x})$ for each voxel vote according to $\Sigma(\vec{x}+\vec{v})=+\Sigma(\vec{x}+\vec{v})+K(\vec{v})$, and after voting, normalizing said radius image by dividing by said weight image.

8. The method of claim 7, wherein selecting candidates for a second vote image comprises finding, for each voxel $\vec{x}$ in the subregion, a voxel, $\vec{v}_{max}$ within the cone whose tip is attached to voxel $\vec{x}$ that has the maximum number of votes, and forming said second voting image $V'(\vec{x})$ by voting for those $\vec{v}_{max}$ voxels whose distance to said cone tip $\vec{x}$ is approximately equal to the normalized radius image value for that point, according to $V'(\vec{x}+\vec{v}_{max})=V'(\vec{x}+\vec{v}_{max})+K(\vec{v}_{max})\log(|\nabla I(\vec{x})|)$.

9. The method of claim 8, further comprising normalizing said second voting image by dividing by said weight image.

10. The method of claim 1, wherein reconfiguring the subregion as a graph further comprises including two additional nodes, {s,t} representing a source and a sink respectively, linking said source and sink to the voxel nodes p∈P forming t-link edges;
    t-link weights in the graph are determined by the second vote image, and the p-link weights are determined by the subregion's intensity and gradient.

11. The method of claim 10, wherein said min-cut algorithm minimizes an energy of the form $$E(f) = \sum_{p \in P} D_p(f_p) + \sum_{p,q \in N} V_{p,q}(f_p, f_q),$$

wherein f=[0,1] is a label distinguishing a vessel node from a non-vessel node, $V_{p,q}$ is a weight for an n-link connecting voxel nodes p, q, $$V_{p,q \in N} = C_1 \exp\left(\frac{\left((I(p)-I(q))^2 + \cos^{-1}\left(\frac{\nabla I(p)}{\|\nabla I(p)\|} \cdot \frac{\nabla I(q)}{\|\nabla I(q)\|}\right)\right)}{2\sigma^2}\right),$$

$D_p$ is a t-link weight defined as $D_p=C_2 A(p)$ for voxel nodes p connected to the source node, and $D_p=C_2(1-A(p))$ for voxel nodes p connected to the sink node, $\sigma^2$, $C_1$ and $C_2$ are predetermined constants, and A(p) is a normalized second vote image evaluated for node p.

12. A computer-implemented method for segmenting tubular structures in digital medical images, said method executed by a computer comprising the steps of:
    extracting a subregion of a digital medical image volume containing a vessel of interest;
    having each voxel in the subregion vote on a vessel center wherein votes are cast in a conical region whose tip is on each said voxel and whose central axis is oriented in a gradient direction, wherein the votes are weighted proportional to the intensity of a gradient at a cone voxel and how close the cone voxel is to the central axis of the cone to create a first vote image, and are weighted proportional to the distance between each voxel in the subregion and the cone voxel to create a radius image;

searching said first vote image for a most popular centerpoint candidate within the conical region for each subregion voxel;

voting for said centerpoint candidate if the distance to the centerpoint candidate from each said subregion voxel is in agreement with the value for a corresponding location in the radius image to form a second vote image;

constructing a graph from the second vote image; and searching said graph for an optimal path from a user supplied endpoint to any point on a vessel surface to recover said vessel of interest.

13. The method of claim 12, wherein extracting a subregion comprises:

segmenting a left ventricle from the image volume using an initial point found by searching for bright circular regions at an orientation commonly assumed by the left ventricle;

determining a second point in an aorta based on spatial and intensity priors relative to said left ventricle segmentation; and extracting an aorta mask, $T(\vec{x})$, by finding a connected component of voxels with intensities crossing a threshold, wherein the threshold is computed using said second point inside said aorta.

14. The method of claim 13, further comprising incrementing a weight image for each voxel vote by a weighting factor associated with said cone defined by $$K(\vec{v}(r,\alpha)) = \frac{\exp(-\alpha^2/2\sigma^2)}{r\cos(\alpha)},$$

wherein voxel $\vec{v}$ is within said cone, $\alpha:[-\alpha_{max},\alpha_{max}]$ is an angle $\vec{v}$ forms with the image gradient vector, $$r:\left[0, \frac{h}{\cos(\alpha_{max})}\right]$$

is a length of a vector represented by $\vec{v}$, and $\sigma^2$ is a predetermined constant, and normalizing said second voting image by dividing by said weight image to form an axial symmetry image.

15. The method of claim 14, wherein vertices V={B,H,U} of said graph are defined as B={$\vec{x}:\nabla T(\vec{x})>\epsilon_2$} wherein $T(\vec{x})$ is the aorta mask, H={$\vec{x}: A(\vec{x})>\epsilon_3$}, the axial symmetry voxels over a threshold; and U is a user supplied endpoint, edges $E_{ij}$ are created between any two vertices i, j which are less than a predetermined distance apart, and the edges are weighted by line integral between two vertices through a multiplicative inverse of the axial symmetry image, $$w(E_{ij}) = \int_{C_{ij}} \frac{1}{A'(s)} ds,$$

wherein $C_{ij}$ is a line segment connecting vertices $v_i$ and $v_j$.

16. The method of claim 12, wherein said graph is searched using Dijkstra's algorithm.

17. A program storage device readable by a computer, tangibly embodying a program of instructions executable by the computer to perform the method steps for segmenting tubular structures in digital medical images, said method comprising the steps of:

extracting a subregion from a 3-dimensional (3D) digital medical volume containing a vessel of interest;

for each voxel in the subregion, identifying potential vessel centerpoints by attaching to each voxel a tip of a 3D cone that is oriented in the direction of the voxel's image gradient and having each voxel within the 3D cone vote for those voxels most likely to belong to a vessel centerline;

selecting candidates for a second vote image that are both popular according to a first vote image, as well as being consistently voted upon by a radius image;

reconfiguring the subregion as a graph wherein each voxel is represented by a node that is connected to 26 nearest neighbors by n-link edges; and applying a min-cut algorithm to segment the vessel within the subregion.

18. The computer readable program storage device of claim 17, wherein the segmented vessel includes branches.

19. The computer readable program storage device of claim 17, the method further comprising detecting intersections of the segmented vessel with the subregion's boundaries, wherein intersection voxels serve as starting voxels for extracting a new subregion overlapping with the current subregion, wherein said new subregion serves to track the vessel's centerline.

20. The computer readable program storage device of claim 17, wherein said subregion is a cubic subregion of size $$x_i = \left[\frac{-d}{2}, \frac{d}{2}\right]$$

for each axis i centered on a user supplied starting voxel wherein d is predetermined based on a vessel category.

21. The computer readable program storage device of claim 17, wherein a voxel $\vec{v}$ within said 3D cone is defined with respect to said cone tip voxel $\vec{x}$ as:

$$\vec{v} = \vec{\Theta}\left(\frac{\nabla I(\vec{x})}{\|\nabla I(\vec{x})\|}\right)\begin{bmatrix} r\cos(\theta)\sin(\alpha), \\ r\sin(\theta)\sin(\alpha), \\ r\cos(\theta) \end{bmatrix}^T,$$

wherein $$\frac{\nabla I(\vec{x})}{\|\nabla I(\vec{x})\|}$$

is the image gradient, $$\vec{\Theta}\left(\frac{\nabla I(\vec{x})}{\|\nabla I(\vec{x})\|}\right)$$

is a rotation matrix aligning the central axis of the cone with the image gradient direction, $\alpha:[-\alpha_{max},\alpha_{max}]$, is an angle $\vec{v}$ forms with the image gradient vector, $$r : \left[0, \frac{h}{\cos(\alpha_{max})}\right],$$

is a length of a vector represented by $\vec{v}$, and $\theta$: $[0,2\pi]$ is a sweep out parameter.

22. The computer readable program storage device of claim 21, wherein voting comprises incrementing a first vote image as $V(\vec{x}+\vec{v})=V(\vec{x}+\vec{v})+K(\vec{v})\log(|\nabla I(\vec{x})|)$ for each voxel $\vec{v}$ in said cone, wherein $$\left(-\frac{d}{2}, -\frac{d}{2}, -\frac{d}{2}\right) \le (\vec{x}+\vec{v}) \le \left(\frac{d}{2}, \frac{d}{2}, \frac{d}{2}\right),$$

incrementing a radius image as $R(\vec{x}+\vec{v})=R(\vec{x}+\vec{v})+K(\vec{v})|\vec{v}-\vec{x}|$, wherein $K(\vec{v})$ is a kernel that weights a point $\vec{v}$ in the cone by $$K(\vec{v}(r,\alpha)) = \frac{\exp(-\alpha^2/2\sigma^2)}{r\cos(\alpha)}.$$

23. The computer readable program storage device of claim 22, the method further comprising incrementing a weight image $\Sigma(\vec{x})$ for each voxel vote according to $\Sigma(\vec{x}+\vec{v})=\Sigma(\vec{x}+\vec{v})+K(\vec{v})$, and after voting, normalizing said radius image by dividing by said weight image.

24. The computer readable program storage device of claim 23, wherein selecting candidates for a second vote image comprises finding, for each voxel $\vec{x}$ in the subregion, a voxel, $\vec{v}_{max}$ within the cone whose tip is attached to voxel $\vec{x}$ that has the maximum number of votes, and forming said second voting image $V'(\vec{x})$ by voting for those $\vec{v}_{max}$ voxels whose distance to said cone tip $\vec{x}$ is approximately equal to the normalized radius image value for that point, according to $V'(\vec{x}+\vec{v}_{max})=V'(\vec{x}+\vec{v}_{max})+K(\vec{v}_{max})\log(|\nabla I(\vec{x})|)$.

25. The computer readable program storage device of claim 24, the method further comprising normalizing said second voting image by dividing by said weight image.

26. The computer readable program storage device of claim 17, wherein reconfiguring the subregion as a graph further comprises including two additional nodes, $\{s,t\}$ representing a source and a sink respectively, linking said source and sink to the voxel nodes $p \in P$ forming t-link edges;

t-link weights in the graph are determined by the second vote image, and the n-link weights are determined by the subregion's intensity and gradient.

27. The computer readable program storage device of claim 26, wherein said min-cut algorithm minimizes an energy of the form $$E(f) = \sum_{p \in P} D_p(f_p) + \sum_{p,q \in N} V_{p,q}(f_p, f_q),$$

wherein $f=[0,1]$ is a label distinguishing a vessel node from a non-vessel node, $V_{p,q}$ is a weight for an n-link connecting voxel nodes p, q, $$V_{p,q,\in N} = C_1 \exp\left(\frac{\left((I(p)-I(q))^2 + \cos^{-1}\left(\frac{\nabla I(p)}{\|\nabla I(p)\|} \cdot \frac{\nabla I(q)}{\|\nabla I(q)\|}\right)\right)}{2\sigma^2}\right),$$

$D_p$ is a t-link weight defined as $D_p=C_2 A(p)$ for voxel nodes p connected to the source node, and $D_p=C_2(1-A(p))$ for voxel nodes p connected to the sink node, $\sigma^2$, $C_1$ and $C_2$ are predetermined constants, and $A(p)$ is a normalized second vote image evaluated for node p.

* * * * *